No. 717,573. PATENTED JAN. 6, 1903.
J. & T. M. HENDRICKSON.
REPLANTING ATTACHMENT FOR CULTIVATORS.
APPLICATION FILED MAY 5, 1902.
NO MODEL. 2 SHEETS—SHEET 1.
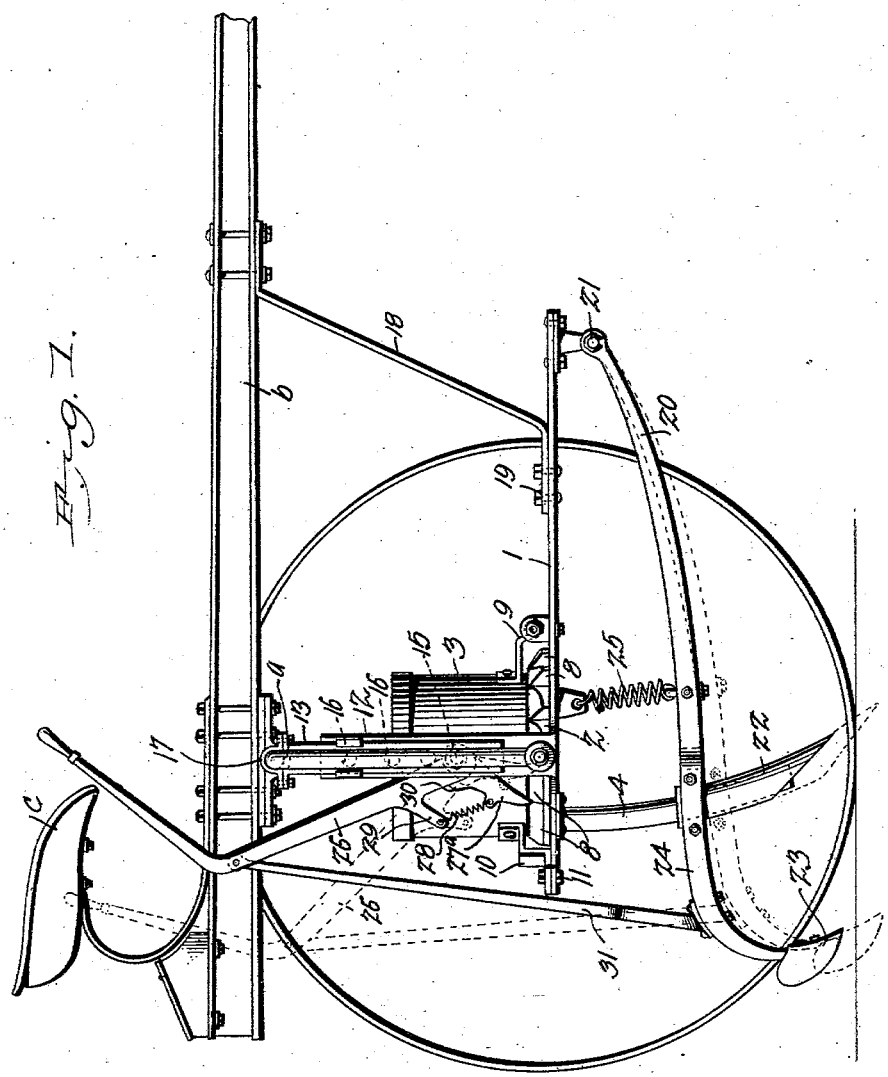

No. 717,573. PATENTED JAN. 6, 1903.
J. & T. M. HENDRICKSON.
REPLANTING ATTACHMENT FOR CULTIVATORS.
APPLICATION FILED MAY 5, 1902.
NO MODEL. 2 SHEETS—SHEET 2.
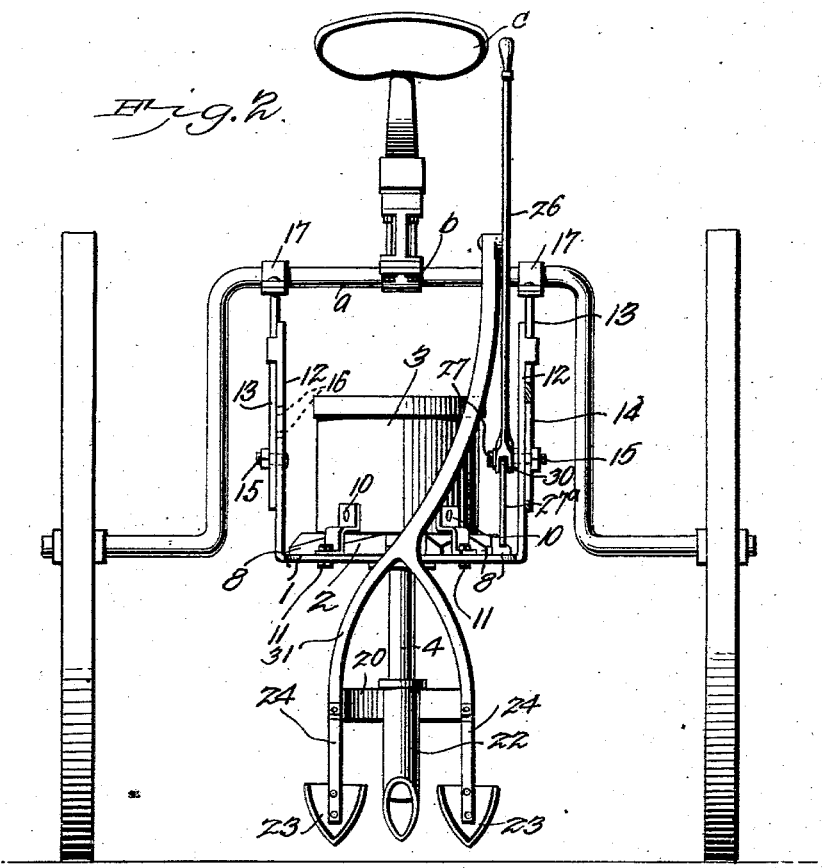
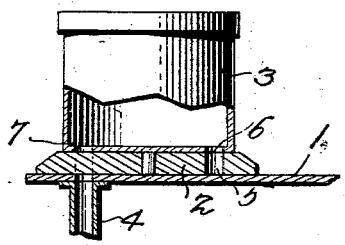
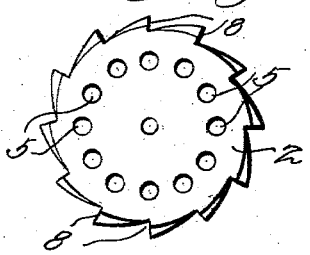

UNITED STATES PATENT OFFICE.

JAMES HENDRICKSON AND THOMAS M. HENDRICKSON, OF LEES SUMMIT, MISSOURI.

REPLANTING ATTACHMENT FOR CULTIVATORS.

SPECIFICATION forming part of Letters Patent No. 717,573, dated January 6, 1903.

Application filed May 5, 1902. Serial No. 106,049. (No model.)

*To all whom it may concern:*

Be it known that we, JAMES HENDRICKSON and THOMAS M. HENDRICKSON, citizens of the United States, residing at Lees Summit, in the county of Jackson and State of Missouri, have invented a new and useful Corn-Replanting Attachment for Cultivators, of which the following is a specification.

Our invention is an improved corn-replanting attachment adapted to be used in connection with a cultivator for replanting corn in hills in which the corn originally planted has failed to sprout, and which attachment is adapted to be used while cultivating the corn, so that the operations of cultivating the corn and replanting the lost hills may be simultaneously performed; and it consists in the peculiar construction and combination of devices hereinafter fully set forth and claimed.

In the accompanying drawings, Figure 1 is a side elevation showing the frame of a sulky-cultivator with the near wheel removed and showing our improved replanting attachment connected to the cultivator for operation therewith. Fig. 2 is a rear elevation of the same. Fig. 3 is a detail elevation, partly in section, showing the hopper and the revoluble seed-dropping disk. Fig. 4 is a top plan view of the seed-dropping disk.

In the embodiment of our invention we provide a platform or frame 1, on the rear portion of which a suitable seed-dropping disk 2 is mounted for revolution, which seed-dropping disk is adapted to receive corn from a hopper 3, that is carried on the rear portion of the frame or platform and to drop the same when said disk is revolved through a flexible tube 4, the upper end of which is secured to the under side of the frame or platform. As here shown the disk 2 has a plurality of seed cups or openings 5, which in coaction with openings 6 and 7 in the bottom of the hopper 3 and in the frame or platform 1, respectively, serve to receive corn as each cup 5 registers with the opening 6 and to drop corn as each of said openings 5 registers with the opening 7 at the upper end of the tube 4; but within the scope of our invention the seed-disk may be of any suitable construction, and we do not limit ourselves in this particular. The seed-disk is provided with peripheral ratchet-teeth 8, and in the form of our invention here shown the said ratchet-teeth register radially with the openings 5 and correspond with the said openings in number.

The front side of the hopper 3 is connected to the frame or platform 1 by a hinge 9, whereby the hopper may be turned forwardly on the frame or platform to uncover and admit of access to the disk 2, and the said hopper has supporting-brackets 10, which project radially from the rear side thereof and which when the hopper is in operative position, as shown in the drawings, are bolted to the frame or platform, as at 11. The frame or platform is provided on its sides and at points opposite the hopper with upwardly-extending arms 12. Links 13 are slidably connected to said arms, and in the form of our invention here shown said links are provided with slots 14 to receive bolts 15, which connect said links to the arms 12, and the latter are provided with adjusting-openings 16 for said bolts. The upper ends of the links are provided with clips or other suitable devices 17, by means of which they may be attached to the arched axle $a$ of an ordinary wheel-cultivator. A draw-bar 18 has its lower rear end connected to the front portion of the frame or platform 1, as at 19, and has its front upper end detachably connected to the tongue $b$ of the cultivator. The arms 12 and links 13, are slidably connected thereto to support the rear portion of the frame or platform and suspend the same under the arched axle and enable the rear end of the frame or platform to be adjusted vertically, as may be desired. Hence our improved attachment may be used in connection with cultivators which vary in the height of their arched axles.

A beam 20 has its front end pivotally connected to the front end of the frame or platform 1 either as shown at 21 in Fig. 1 of the drawings or by any other suitable means. The said beam 20 is provided at its rear end with a tubular furrow-opening shoe 22, into which the flexible tube 4 extends, the lower portion of said flexible tube being disposed in said tubular furrow-opening shoe, so that the latter is adapted to rise and be lowered on the former. A pair of covering-shovels 23 have their beams 24 bolted or otherwise secured to the beam 20. A spring 25, which is here shown as a coiled retractile spring, connects the beam 20 to the frame or platform 1 and serves to raise the said beam 20 and normally support the same, together with the furrow-opening shoe 22 and the covering-shovels 23, carried thereby, at a sufficient elevation to keep said furrow-opening shoe and covering-shovels from engaging the soil.

A hand-lever 26 is fulcrumed to one of the arms 12, as at 27. The said hand-lever is provided at its lower pivoted end with a spring-pressed pawl 27ᵃ. The spring 28, which is connected to the pawl, is here shown as a coiled retractile spring and with its rear end connected to a short arm 29, with which the lever 26 is provided. The said pawl 27ᵃ is formed with a stop 30, which coacts with the lever 26 to limit the rearward movement of said pawl on its pivot. The said pawl is so disposed with reference to the disk 2 that when the lever 26 is depressed rearwardly the said pawl will engage one of the ratchet-teeth of said disk and turn the latter through part of a revolution, so as to cause the same to drop seeds through the spout or tube 4 and the tubular furrow-opening shoe to the ground. The said lever 26 is connected by a suitable link 31 to the beams 24, which are rigid with the beam 20, and hence it will be understood that when the lever 26 is depressed to cause the pawl 27ᵃ to partly rotate the seed-disk 2, and thereby cause the same to drop seeds, as hereinbefore described, the beam 20, which carries the furrow-opening shoe and the covering-shovels will be depressed sufficiently to cause said shoe and covering-shovels to operate in the soil, and thereby cause a hill to be opened, seeds to be dropped therein, and covered while the lever 26 is depressed, whereupon the lever will be immediately, by the spring 25, raised to its initial position to again elevate the furrow-opener and the covering-shovels from the ground and cause the pawl 27ᵃ to be disposed in position to reëngage the seed-disk when the lever is again depressed. The link 31, which connects the beams that carry the furrow-opener with the lever 26, is pivoted thereto away from the pawl 27ᵃ or at a greater distance from the fulcrum 27 than said pawl and near the outer end of the lever, whereby any downward stress upon said lever is directly operative upon the furrow-opener and greater vertical swing is given thereto. It will be understood that while cultivating corn the operator by using the lever 26 appropriately will cause our improved replanting attachment to replant the lost hills, hence enabling the corn to be plowed or cultivated and replanted at the same time. Where the cultivator is provided with a seat for the driver, as indicated at c, the lever 26 will be of such length and shape as to enable the same to be readily grasped and operated by the driver.

Where our improved replanting attachment is used on a walking-cultivator, a suitable rod, chain, or other device will be attached to the lever 26 and extended to one of the cultivator-handles, whereby said lever 26 may be operated by the plowman.

Having thus described our invention, we claim—

1. In a replanter, the combination with a frame, a seed-dropping mechanism and a furrow-opener, of a lever fulcrumed on said frame and operatively connected with the seed-dropper and the furrow-opener, the connection with the latter being at a greater distance from the fulcrum than the connection with the seed-dropper.

2. In a replanter, the combination with a cultivator, of a frame secured thereto by a fore brace and an after brace, a seed-dropper secured on said frame in line with the axle of the cultivator, a furrow-opener pivotally connected to said frame below said seed-dropper, a lever fulcrumed on said frame near the seed-dropper and having means to operate the same and a bar connecting the said lever and the furrow-opener near their outer ends.

In testimony that we claim the foregoing as our own we have hereto affixed our signatures in the presence of two witnesses.

JAMES HENDRICKSON.
THOMAS M. HENDRICKSON.

Witnesses:
W. W. McKEIGHAN,
EDNA BOWIN.